(12) United States Patent
Ahn et al.

(10) Patent No.: US 10,388,938 B2
(45) Date of Patent: *Aug. 20, 2019

(54) SECONDARY BATTERY PACK HAVING PCM

(71) Applicant: LG CHEM, LTD., Seoul (KR)

(72) Inventors: Soo Jun Ahn, Daejeon (KR); Dong Cheol Lee, Daejeon (KR); Tae Wook Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 94 days.

This patent is subject to a terminal disclaimer.

(21) Appl. No.: 15/023,868

(22) PCT Filed: Aug. 6, 2014

(86) PCT No.: PCT/KR2014/007262
§ 371 (c)(1),
(2) Date: Mar. 22, 2016

(87) PCT Pub. No.: WO2015/046745
PCT Pub. Date: Apr. 2, 2015

(65) Prior Publication Data
US 2016/0233479 A1    Aug. 11, 2016

(30) Foreign Application Priority Data

Sep. 27, 2013   (KR) .................. 10-2013-0115435

(51) Int. Cl.
*H01M 2/26* (2006.01)
*H01M 2/28* (2006.01)
(Continued)

(52) U.S. Cl.
CPC ......... *H01M 2/345* (2013.01); *H01M 2/1066* (2013.01); *H01M 2/26* (2013.01);
(Continued)

(58) Field of Classification Search
CPC ..... H01M 2/0207; H01M 2/0404; H01M 2/26
See application file for complete search history.

(56) References Cited

U.S. PATENT DOCUMENTS 9,083,028 B2 * 7/2015 Choi ................ H01M 2/26
2006/0057458 A1 * 3/2006 O'Dea ............ H01M 2/0207
429/7
(Continued)

FOREIGN PATENT DOCUMENTS

CN   101174706 A   5/2008
CN   102916154 A   2/2013
(Continued)

OTHER PUBLICATIONS

International Search Report issued in PCT/KR2014/007262 dated Nov. 26, 2014.

*Primary Examiner* — Cynthia H Kelly
*Assistant Examiner* — Julian Anthony
(74) *Attorney, Agent, or Firm* — Birch, Stewart, Kolasch & Birch, LLP

(57) ABSTRACT

Disclosed herein is a secondary battery pack including an anode terminal and a cathode terminal of a battery cell connected to a protection circuit module (PCM), the anode terminal and the cathode terminal of the battery cell being made of plate-shaped conductive members, the battery cell having the anode terminal and the cathode terminal formed at one end thereof, the battery cell having a thermally bonded surplus part formed at the end thereof at which the anode terminal and the cathode terminal are formed, and the PCM including a protection circuit board (PCB) having a protection circuit formed thereon, an external input and output terminal connected to the protection circuit of the PCB, and an electrically insulative PCM case configured to have a hollow structure in which the PCB is mounted, the PCM case being provided with a slit, through which (Continued)

electrode terminals of the battery cell are inserted, the PCM being loaded on the thermally bonded surplus part of the battery cell in a state in which the PCM is electrically connected to the battery cell.

11 Claims, 4 Drawing Sheets

(51) Int. Cl.
*H01M 14/00* (2006.01)
*H01M 2/02* (2006.01)
*H01M 2/34* (2006.01)
*H01M 2/10* (2006.01)
*H01M 10/42* (2006.01)
*H01M 10/0525* (2010.01)
*H01M 10/052* (2010.01)

(52) U.S. Cl.
CPC ......... *H01M 2/34* (2013.01); *H01M 10/0525* (2013.01); *H01M 10/4257* (2013.01); *H01M 10/052* (2013.01); *H01M 2200/106* (2013.01); *H01M 2200/20* (2013.01); *H01M 2220/30* (2013.01)

(56) References Cited

U.S. PATENT DOCUMENTS

| | | | | |
|---|---|---|---|---|
| 2007/0264535 A1* | 11/2007 | Lee | ............... | H01M 2/0207 429/7 |
| 2008/0107964 A1 | 5/2008 | Choi | | |
| 2009/0202912 A1 | 8/2009 | Baba et al. | | |
| 2010/0003592 A1 | 1/2010 | Baba et al. | | |
| 2011/0003179 A1* | 1/2011 | Jang | ............... | H01M 2/0404 429/7 |
| 2011/0052976 A1 | 3/2011 | Ishii et al. | | |
| 2013/0034750 A1* | 2/2013 | Choi | ............... | H01M 10/058 429/7 |
| 2013/0040170 A1 | 2/2013 | Choi et al. | | |
| 2013/0089757 A1 | 4/2013 | Baek | | |
| 2013/0149561 A1 | 6/2013 | Hong et al. | | |
| 2014/0023885 A1 | 1/2014 | Choi et al. | | |
| 2014/0147707 A1 | 5/2014 | Choi et al. | | |

FOREIGN PATENT DOCUMENTS

| | | |
|---|---|---|
| CN | 102931373 A | 2/2013 |
| CN | 103165833 A | 6/2013 |
| CN | 203150632 U | 8/2013 |
| CN | 203218397 U | 9/2013 |
| EP | 2731175 A2 | 5/2014 |
| EP | 2744017 A2 | 6/2014 |
| JP | 2005-123158 A | 5/2005 |
| JP | 2008-103324 A | 5/2008 |
| JP | 2013-38064 A | 2/2013 |
| JP | 2013-38065 A | 2/2013 |
| JP | 2013-41810 A | 2/2013 |
| JP | 2014-522089 A | 8/2014 |
| KR | 10-2013-0018097 A | 2/2013 |
| KR | 10-2013-0018098 A | 2/2013 |
| KR | 10-2013-0018127 A | 2/2013 |
| KR | 10-2013-0030285 A | 3/2013 |
| KR | 10-2013-0038143 A | 4/2013 |
| TW | 447157 B | 7/2001 |
| TW | 466790 B | 12/2001 |
| TW | 504854 B | 10/2002 |
| TW | I299921 A | 10/2006 |
| TW | 201320441 A1 | 5/2013 |

* cited by examiner

【FIG. 1】
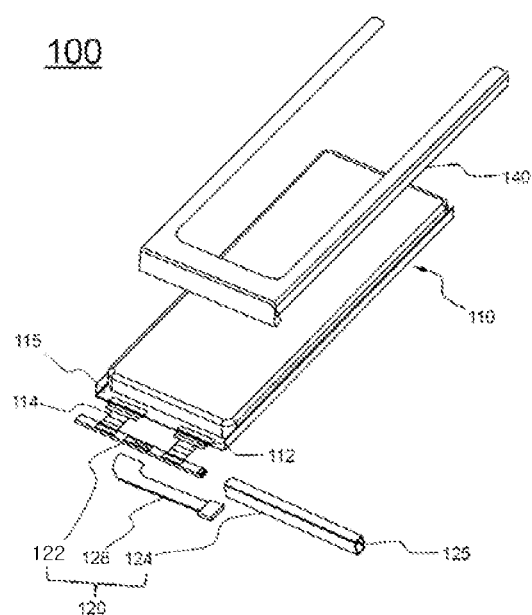
【FIG. 2】
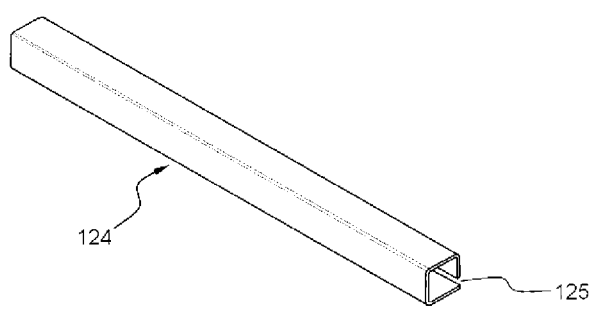

【FIG. 3】
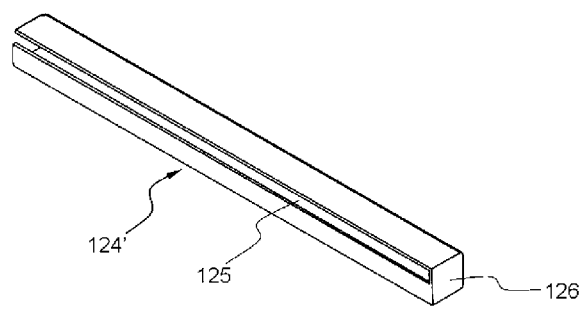
【FIG. 4】
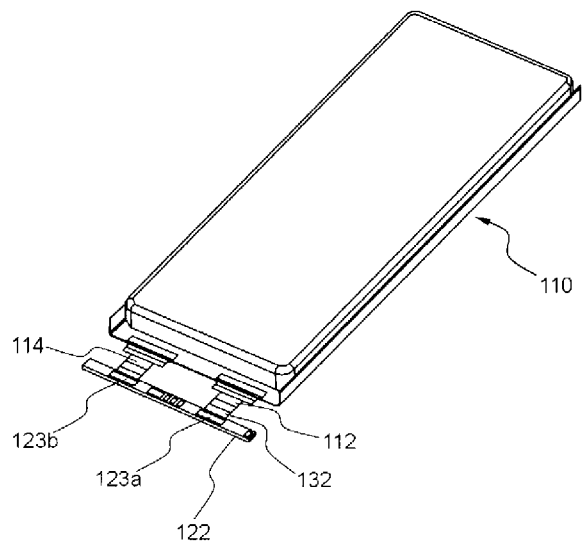

[FIG. 5]
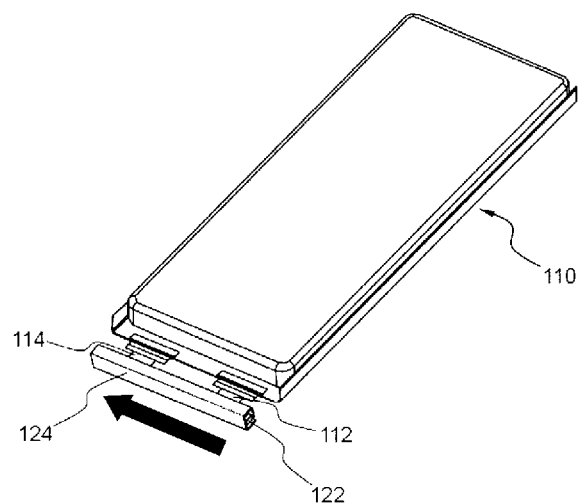
[FIG. 6]
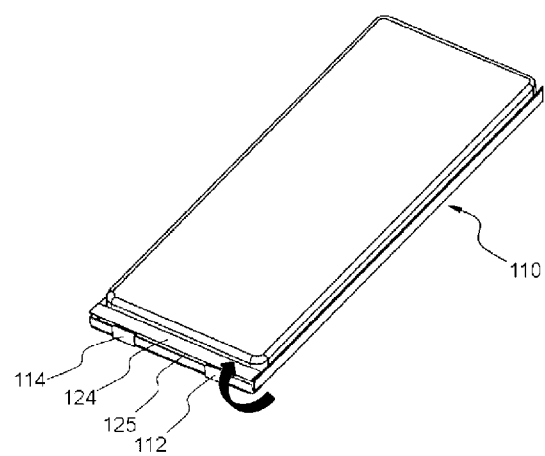

【FIG. 7】
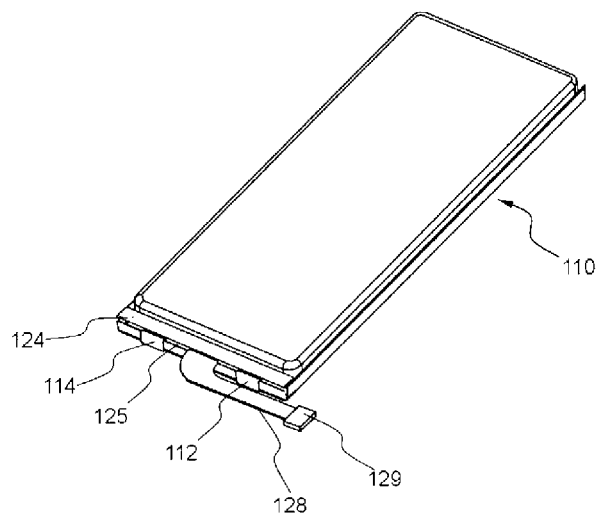

SECONDARY BATTERY PACK HAVING PCM

TECHNICAL FIELD

The present invention relates to a secondary battery pack including a protection circuit module (PCM) and, more particularly, to a secondary battery pack including an anode terminal and a cathode terminal of a battery cell connected to a PCM, the anode terminal and the cathode terminal of the battery cell being made of plate-shaped conductive members, the battery cell having the anode terminal and the cathode terminal formed at one end thereof, the battery cell having a thermally bonded surplus part formed at the end thereof at which the anode terminal and the cathode terminal are formed, and the PCM including a protection circuit board (PCB) having a protection circuit formed thereon, an external input and output terminal connected to the protection circuit of the PCB, and an electrically insulative PCM case configured to have a hollow structure in which the PCB is mounted, the PCM case being provided with a slit, through which the electrode terminals of the battery cell are inserted, the PCM being loaded on the thermally bonded surplus part of the battery cell in a state in which the PCM is electrically connected to the battery cell.

BACKGROUND ART

As mobile devices have been increasingly developed, and the demand for such mobile devices has increased, the demand for secondary batteries has also sharply increased. Among such secondary batteries is a lithium secondary battery exhibiting high energy density and operating voltage and excellent charge retention and service-life characteristics, which has been widely used as an energy source for various electronic products as well as various kinds of mobile devices.

Depending upon types of external devices in which secondary batteries are used, the secondary batteries may be configured to have a detachable type structure in which the secondary batteries can be easily inserted into and removed from the external devices or to have an embedded type structure in which the secondary batteries are embedded in the external devices. For example, it is possible for a user to insert or remove a battery into or from a device, such as a laptop computer, as needed. On the other hand, devices, such as specific mobile phones, require an embedded type battery pack due to the structure and capacity thereof.

Meanwhile, various kinds of combustible materials are contained in the lithium secondary battery. As a result, the lithium secondary battery may be heated or explode due to the overcharge of the battery, the overcurrent in the battery, or other external physical impact against the battery. That is, the safety of the lithium secondary battery is very low. For this reason, safety elements, such as a positive temperature coefficient (PTC) element and a protection circuit module (PCM), which are capable of effectively controlling an abnormal state of the lithium secondary battery, such as the overcharge of the lithium secondary battery or the overcurrent in the lithium secondary battery, are connected to a battery cell of the lithium secondary battery.

In general, an embedded type secondary battery pack uses a plate-shaped battery cell, which is suitable for electrical connection, and a PCM is connected to the battery cell via conductive nickel plates by welding or soldering. That is, the nickel plates are connected to electrode terminals of the battery cell by welding or soldering, a protection circuit board (PCB) is connected to one side of each of the nickel plates by welding, a protective tape is attached to the other side of each of the nickel plates, and electrode tabs of the PCB and the nickel plates are connected to each other by welding in a state in which the PCB is in tight contact with the battery cell. In this way, the PCM is connected to the battery cell to manufacture a battery pack.

A conventional PCM case includes an upper case and a lower case. That is, the PCM case is a two-unit member. The upper case is coupled to the lower case in a state in which the PCM and the safety elements are loaded in the lower case.

It is required for the safety elements, including the PCM, to be maintained in electrical connection with the electrode terminals of the battery cell and, at the same time, to be electrically isolated from other parts of the battery cell.

To this end, insulative tapes are attached to various members, including the PCM. In addition, a portion of a sealed part of a battery case, in which the battery cell is received, is bent, and an insulative tape is attached thereto or a barcode is printed thereon. That is, the process is very complicated.

Since a plurality of insulative tapes or parts is required to achieve safe connection as described above, a battery pack assembly process is complicated and manufacturing cost is increased.

In addition, when external impact is applied to the battery pack, the PCM may be damaged or dimensional stability of the battery pack may be greatly lowered due to the use of the insulative tapes, which exhibit low mechanical strength.

Therefore, there is a high necessity for technology that is capable of reducing the number of members mounted at the battery cell to simplify an assembly process, achieving stable coupling between members loaded on the battery cell, and protecting the PCM.

DISCLOSURE

Technical Problem

Therefore, the present invention has been made to solve the above problems, and other technical problems that have yet to be resolved.

Specifically, it is an object of the present invention to provide a battery pack wherein the number of parts necessary to manufacture the battery pack is reduced, thereby simplifying an assembly process, and structural stability of the battery pack is improved.

It is another object of the present invention to provide a battery pack configured to have a structure in which a protection circuit board (PCB) is mounted in a protection circuit module (PCM) case through a simplified process.

Technical Solution

In accordance with one aspect of the present invention, the above and other objects can be accomplished by the provision of a secondary battery pack including an anode terminal and a cathode terminal of a battery cell connected to a protection circuit module (PCM), the anode terminal and the cathode terminal of the battery cell being made of plate-shaped conductive members, the battery cell having the anode terminal and the cathode terminal formed at one end thereof, the battery cell having a thermally bonded surplus part formed at the end thereof at which the anode terminal and the cathode terminal are formed, and the PCM including a protection circuit board (PCB) having a protection circuit formed thereon, an external input and output terminal connected to the protection circuit of the PCB, and an electrically insulative PCM case configured to have a hollow structure in which the PCB is mounted, the PCM case being provided with a slit, through which the electrode terminals of the battery cell are inserted, the PCM being loaded on the thermally bonded surplus part of the battery cell in a state in which the PCM is electrically connected to the battery cell.

As described above, the secondary battery pack according to the present invention is configured to have a structure in which the PCM including the PCM case in which the PCB is mounted through the slit formed at the PCM case is loaded on the thermally bonded surplus part of the battery cell. As compared with a conventional embedded type secondary battery pack, therefore, it is possible to effectively protect the PCB and to greatly reduce the number of parts constituting the secondary battery pack, thereby reducing manufacturing cost.

In addition, the secondary battery pack according to the present invention includes the PCM case, which is constituted by a single member. As compared with an assembly process of a conventional PCM configured to have an assembly fastening structure, therefore, it is possible to greatly improve manufacture processability. Furthermore, the secondary battery pack according to the present invention is configured to have a structure which can be easily automated.

In the secondary battery pack according to the present invention, various types of battery cells may be used. For example, the battery cell may be a secondary battery having a small thickness and lightweight configured to have a structure in which an electrode assembly including a cathode, an anode, and a separator disposed between the cathode and the anode is mounted in a battery case made of a laminate sheet including a metal layer and a resin layer in a sealed state.

The PCM case may wrap the PCM excluding the external input and output terminal.

The PCM case is not particularly restricted so long as the PCM case is configured to have a hollow structure in which the PCB is mounted and, in addition, is provided with the slit, through which the electrode terminals are inserted into the PCM case. For example, the PCM case may be formed in the shape of a polygonal bar, a circular bar, or an oval bar. In a concrete example, the PCM case may be formed in the shape of a quadrangular bar having a hollow structure.

The PCM case formed in the shape of one of the various bars having the slit as described above may be configured to have a structure in which one end of the bar is open and the other end of the bar is closed. Alternatively, the PCM case may be configured to have a structure in which the bar is open at opposite ends thereof.

For example, the slit of the PCM case may be formed at one side of the bar. In a concrete example, the slit may be formed at an edge of one side of the PCM case formed in the shape of the quadrangular bar.

The PCM may be easily mounted in the PCM case due to the structure of the PCM case as described above. Specifically, the anode terminal and the cathode terminal of the battery cell and the external input and output terminal of the PCM may be inserted through the slit from one end of the PCM case such that the PCB is mounted into the PCM case.

As described above, at least one end of the PCM case may be open and the PCB may be inserted through the open end of the PCM case such that the PCB is mounted into the PCM case in a sliding fashion. At this time, the anode terminal and the cathode terminal, via which the PCB is connected to the battery cell, may slide along the slit. In addition, the external input and output terminal, via which the PCB is connected to an external device, may slide along the slit together with the anode terminal and the cathode terminal such that the external input and output terminal is coupled to the PCM case.

In a case in which the PCM case is configured to have a structure in which one end of the PCM case is open and the other end of the PCM case is closed, on the other hand, the closed end of the PCM case may function as a stopper to stop sliding of the PCB at an appropriate position of the PCM case when the PCB slides into the PCM case.

Meanwhile, the secondary battery pack according to the present invention may further include a label attached to the PCM, excluding the external input and output terminal, and the outside of the battery cell in a wrapping fashion. Specifically, the label may be attached to the PCM, excluding the external input and output terminal, and thermally bonded edges of opposite sides of the battery cell in a wrapping fashion. Consequently, it is possible for the label to fix the thermally bonded edges such that the thermally bonded edges are in tight contact with a main body of the battery cell while maintaining an insulation state of the battery cell. In addition, it is possible for the label to more stably secure electrical connection between the electrode terminals of the battery cell and the PCB.

The type of the battery cell is not particularly restricted. For example, the battery cell may be a lithium secondary battery having a large energy storage capacity per volume.

In accordance with another aspect of the present invention, there is provided a device including the secondary battery pack with the above-stated construction as a power source. For example, the device may be any one selected from among a mobile phone, a portable computer, a smart phone, a smart pad, a tablet PC, and a netbook computer. However, the present invention is not limited thereto.

In accordance with a further aspect of the present invention, there is provided a method of manufacturing the secondary battery pack with the above-stated construction.

Specifically, the secondary battery pack according to the present invention may be manufactured using method including (a) connecting a nickel plate to a cathode terminal of a battery cell by welding, (b) connecting an anode terminal and the cathode terminal of the battery cell 110 to an anode terminal joint part and a cathode terminal joint part formed at a PCB, respectively, by welding, (c) inserting the electrode terminals of the battery cell through a slit such that the PCB is mounted into a PCM case in a sliding fashion, (d) bending the electrode terminals of the battery cell and mounting the PCM at the thermally bonded surplus part of the battery cell, and (e) wrapping the PCM, excluding the external input and output terminal and a top of the PCM, and the battery cell in a label.

The manufacturing method according to the present invention simplifies a PCM assembly process, which is a portion of the process of manufacturing the secondary battery pack, thereby improving productivity. Specifically, in a structure of a conventional PCM in which a PCB is mounted in a PCM case including an upper case and a lower case, the upper case is coupled to the lower case in a state in which the PCB is loaded on the lower case. As a result, the conventional manufacturing method has a disadvantage in that a plurality of steps and accurate control are needed during assembly of the PCM.

In the method of manufacturing the secondary battery pack according to the present invention, on the other hand, the PCB is simply and easily mounted into the PCM case in a sliding fashion. Consequently, the manufacturing method according to the present invention has an advantage in that it is possible to improve manufacture processability and to easily achieve automation.

BRIEF DESCRIPTION OF DRAWINGS

The above and other objects, features and other advantages of the present invention will be more clearly understood from the following detailed description taken in conjunction with the accompanying drawings, in which:

FIG. 1 is an exploded perspective view showing a secondary battery pack according to an embodiment of the present invention;

FIG. 2 is an enlarged view of a protection circuit module (PCM) case shown in FIG. 1;

FIG. 3 is a perspective view showing a PCM case according to another embodiment of the present invention;

FIGS. 4 to 6 are perspective views showing a process of manufacturing the secondary battery pack of FIG. 1; and FIG. 7 is a perspective view showing an external input and output terminal connected to a structure shown in FIG. 6.

BEST MODE

Now, exemplary embodiments of the present invention will be described in detail with reference to the accompanying drawings. It should be noted, however, that the scope of the present invention is not limited by the illustrated embodiments.

FIG. 1 is an exploded perspective view typically showing a secondary battery pack according to an embodiment of the present invention.

Referring to FIG. 1, a secondary battery pack 100 includes a battery cell 110 having an anode terminal 114 and a cathode terminal 112 protruding from one end thereof, a protection circuit module (PCM) 120, and a label 140.

The anode terminal 114 and the cathode terminal 112 of the battery cell 110 are made of plate-shaped conductive members. The anode terminal 114 and the cathode terminal 112 of the battery cell 110 are electrically connected to a protection circuit board (PCB) 122 of the protection circuit module (PCM) 120.

The battery cell 110 is a pouch-shaped secondary battery having an electrode assembly of a cathode/separator/anode structure received in a battery case made of a laminate sheet including a metal layer and a resin layer in a sealed state. The anode terminal 114 and the cathode terminal 112 are formed at one end of the battery cell 110. A thermally bonded surplus part 115 is formed at an upper end case extension part of the battery cell 110.

The PCM 120 includes the PCB 122, which has a protection circuit formed thereon, an external input and output terminal 128 electrically connected to the protection circuit of the PCB 122, and a PCM case 124 coupled to the PCB 122 while wrapping the PCB 122.

In addition, the PCM 120 is loaded on the thermally bonded surplus part 115 in a state in which the PCM 120 is electrically connected to the battery cell 110.

The PCM case 124 is configured to have a hollow structure in which the PCB 122 is mounted. In addition, the PCM case 124 is provided with a slit 125, through which the electrode terminals 112 and 114 are inserted into the PCM case 124.

The external input and output terminal 128 is configured to have a plate structure including a connector mounted at one end thereof.

In a state in which the PCB 122, electrically connected to the cathode terminal 112 and the anode terminal 114 of the battery cell 110, is wrapped by the PCM case 124, the PCM 120 is loaded on the thermally bonded surplus part 115 located at the upper end case extension part of the battery cell 110. As compared with a conventional embedded type secondary battery pack, therefore, it is possible to effectively protect the PCB 122, to greatly reduce the number of parts constituting the secondary battery pack 100, to configure the secondary battery pack 100 so as to have a more compact structure.

In addition, unlike a conventional PCM case having a structure in which a plurality of parts is assembled, the PCB 122 is inserted into the PCM case 124, which is constituted by a single member, in a sliding insertion fashion. Consequently, it is possible to improve manufacture processability.

FIG. 2 is an enlarged view of the PCM case shown in FIG. 1.

Referring to FIG. 2 together with FIG. 1, the PCM case 124 is formed in the shape of a quadrangular bar open at opposite ends thereof. In addition, the PCM case 124 is configured to have a hollow structure in which the PCB 122 is mounted. The slit 125 is formed along the edge of one side of the quadrangular bar. The anode terminal 114 and the cathode terminal 112 of the battery cell 110 and the external input and output terminal 128 of the PCM 120 are inserted through the slit 125 from one end of the PCM case 124 such that the PCB 122 is mounted into the PCM case 124.

FIG. 3 is a perspective view showing a PCM case according to another embodiment of the present invention.

Referring to FIG. 3, a PCM case 124' is configured to have a structure in which one end of the PCM case 124' is open and the other end 126 of the PCM case 124' is closed unlike the PCM case 124 of FIG. 2 which is open at the opposite ends thereof. The closed end 126 of the PCM case 124' functions as a stopper to stop sliding of the PCB 122 at an appropriate position of the PCM case 124' when the PCB 122 slides into the PCM case 124'.

FIGS. 4 to 6 are perspective views showing a process of manufacturing the secondary battery pack of FIG. 1.

The process of manufacturing the secondary battery pack will be described with reference to these drawings together with FIG. 1.

Referring first to FIG. 4, a nickel plate 132 is connected to the top of the cathode terminal 112 of the battery cell 110, which is coupled to a cathode terminal joint part 123a of the PCB 122, by ultrasonic welding. Subsequently, the anode terminal 114 and the cathode terminal 112 of the battery cell 110 are respectively connected to an anode terminal joint part 123b and the cathode terminal joint part 123a formed at the PCB 122 by spot welding to electrically connect the PCB 122 to the battery cell 110.

A process of mounting the PCB 122 into the PCM case 124 is shown in FIG. 5. The cathode terminal 112 and the anode terminal 114 of the battery cell 110 are inserted through the slit 125 such that the PCB 122 is mounted into the PCM case 124 in a sliding fashion. Subsequently, as shown in FIG. 6, the electrode terminals 112 and 114 of the battery cell 110 are bent and the PCM 120 is mounted at the thermally bonded surplus part 115 of the battery cell 110.

Subsequently, the PCM 120, excluding the external input and output terminal 128, and thermally bonded edges of the opposite sides of the battery cell 110 are wrapped by the label 140 to manufacture the secondary battery pack 100.

The label 140 fixes the thermally bonded edges such that the thermally bonded edges are in tight contact with a main body of the battery cell 110 while maintaining an insulation state of the battery cell 110. In addition, the label 140 more stably secures electrical connection between the cathode terminal 112 and the anode terminal 114 of the battery cell 110 and the PCB 122.

FIG. 7 is a perspective view showing the external input and output terminal connected to the structure shown in FIG. 6.

Referring to FIG. 7, the external input and output terminal 128 is connected to the PCB 122 disposed in the PCM case 124 through the slit 125. A connector 129, which is coupled to an external device, is formed at one end of the external input and output terminal 128.

Although the external input and output terminal 128 is connected to the PCB 122 in a state in which the external input and output terminal 128 protrudes between the cathode terminal 112 and the anode terminal 114 of the battery cell 110 as shown in FIG. 7, the external input and output terminal 128 may protrude from the open side of the PCM case 124.

In addition, the external input and output terminal 128 may be connected to the PCB 122 together with the cathode terminal 112 and the anode terminal 114 of the battery cell 110 and then protrude outward through the processes shown in FIGS. 4 to 6. That is, the electrode terminals 112 and 114 may be bent such that the slit 125 of the PCM case 124 is directed in the outward direction of the battery cell 110 and then the PCM 120 may be mounted at the thermally bonded surplus part 115 of the battery cell 110 such that the external input and output terminal 128 protrudes outward.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a secondary battery pack according to the present invention is configured to have a structure in which a protection circuit module (PCM) including a PCM case in which a printed circuit board (PCB) is mounted through a slit formed at the PCM case is loaded on a thermally bonded surplus part of a battery cell. As compared with a conventional embedded type secondary battery pack, therefore, it is possible to effectively protect the PCB and to greatly reduce the number of parts constituting the secondary battery pack, thereby reducing manufacturing cost.

In addition, the secondary battery pack according to the present invention is configured to have a structure in which the PCB is inserted into the PCM case, which is constituted by a single member, in a sliding insertion fashion. As compared with an assembly process of a conventional PCM configured to have an assembly fastening structure, therefore, it is possible to greatly improve manufacture processability. Furthermore, the secondary battery pack according to the present invention is configured to have a structure which can be easily automated.

The invention claimed is:

1. A secondary battery pack comprising:
an anode terminal and a cathode terminal of a battery cell connected to a protection circuit module (PCM), the anode terminal and the cathode terminal of the battery cell being made of plate-shaped conductive members;
the battery cell having the anode terminal and the cathode terminal formed at one end thereof, the battery cell having a thermally bonded surplus part formed at the end thereof at which the anode terminal and the cathode terminal are formed; and
the PCM comprising a protection circuit board (PCB) having a protection circuit formed thereon, an external input and output terminal connected to the protection circuit of the PCB, and an electrically insulative PCM case configured to have a hollow structure in which the PCB is mounted, the PCM case being provided with a slit, through which electrode terminals of the battery cell are inserted, the PCM being loaded on the thermally bonded surplus part of the battery cell in a state in which the PCM is electrically connected to the battery cell,
wherein the PCM case is formed in the shape of a quadrangular bar in which one end of the quadrangular bar is open and the other end of the quadrangular bar is closed, and
wherein the PCM case is configured to have a structure in which the slit is formed at an edge of one side of the quadrangular bar.

2. The secondary battery pack according to claim 1, wherein the battery cell is a secondary battery having an electrode assembly comprising a separator disposed between a cathode and an anode mounted in a battery case made of a laminate sheet comprising a metal layer and a resin layer in a sealed state.

3. The secondary battery pack according to claim 1, wherein the PCM case wraps the PCM excluding the external input and output terminal.

4. The secondary battery pack according to claim 1, wherein the anode terminal and the cathode terminal of the battery cell and the external input and output terminal of the PCM are inserted through the slit from one end of the PCM case such that the PCB is mounted into the PCM case.

5. The secondary battery pack according to claim 4, wherein the PCB is mounted into the PCM case in a sliding fashion.

6. The secondary battery pack according to claim 1, further comprising a label attached to the PCM, excluding the external input and output terminal, and the battery cell in a wrapping fashion.

7. The secondary battery pack according to claim 6, wherein the label is attached to the PCM, excluding the external input and output terminal, and thermally bonded edges of opposite sides of the battery cell in a wrapping fashion.

8. The secondary battery pack according to claim 1, wherein the battery cell is a lithium secondary battery.

9. A device comprising a secondary battery pack according to claim 1 as a power source.

10. The device according to claim 9, wherein the device is selected from among a mobile phone, a portable computer, a smart phone, a smart pad, a tablet PC, and a netbook computer.

11. A method of manufacturing a secondary battery pack, the method comprising:
(a) connecting a nickel plate to a cathode terminal of a battery cell by welding;
(b) connecting an anode terminal and the cathode terminal of the battery cell to an anode terminal joint part and a cathode terminal joint part formed at a protection circuit board (PCB) of a protection circuit module (PCM), respectively, by welding;
(c) inserting the electrode terminals of the battery cell through a slit of a PCM case such that the PCB is mounted into the PCM case in a sliding fashion;
(d) bending the electrode terminals of the battery cell and mounting the PCM at a thermally bonded surplus part of the battery cell; and
(e) wrapping the PCM, excluding an external input, an output terminal, and a top of the PCM, and the battery cell in a label,
wherein the PCM case is formed in the shape of a quadrangular bar in which one end of the quadrangular bar is open and the other end of the quadrangular bar is closed, and
wherein the PCM case is configured to have a structure in which the slit is formed at an edge of one side of the quadrangular bar.

\* \* \* \* \*